(12) United States Patent
    Perbandt et al.

(10) Patent No.: US 8,874,330 B2
(45) Date of Patent: Oct. 28, 2014

(54) METHOD FOR MONITORING COMPONENTS OF A MOTOR VEHICLE AND MOTOR VEHICLE WITH CORRESPONDING MONITORING DEVICE

(75) Inventors: Thomas Perbandt, Donauwörth (DE); Reinhard Merl, Graz (AT)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/008,378

(22) PCT Filed: Mar. 20, 2012

(86) PCT No.: PCT/EP2012/001214
    § 371 (c)(1),
    (2), (4) Date: Sep. 27, 2013

(87) PCT Pub. No.: WO2012/130403
    PCT Pub. Date: Oct. 4, 2012

(65) Prior Publication Data
    US 2014/0019019 A1    Jan. 16, 2014

(30) Foreign Application Priority Data
    Mar. 29, 2011    (DE) .......................... 10 2011 015 396

(51) Int. Cl.
    *G06F 7/00*    (2006.01)
    *G07C 5/00*    (2006.01)
    *F01N 11/00*    (2006.01)
    *F02D 41/22*    (2006.01)
    *F23R 3/40*    (2006.01)
    *B01J 37/00*    (2006.01)

(52) U.S. Cl.
    CPC ... *G07C 5/00* (2013.01); *F23R 3/40* (2013.01); *B01J 37/009* (2013.01); *F01N 11/00* (2013.01); *F01N 2560/025* (2013.01); *F01N 2900/102* (2013.01); *F02D 41/221* (2013.01); *F02D 41/222* (2013.01); *F02D 2200/701* (2013.01); *F02D 2200/702* (2013.01); *Y02T 10/40* (2013.01); *Y02T 10/47* (2013.01)
    USPC .............................................. 701/51; 701/54

(58) Field of Classification Search
    CPC ................................. F23R 3/40; B01J 37/009
    USPC ..................................................... 701/51, 54
    See application file for complete search history.

(56) References Cited

U.S. PATENT DOCUMENTS 5,977,738 A * 11/1999 Cui et al. ...................... 318/632
6,474,292 B1    11/2002 Frenz et al.
(Continued)

FOREIGN PATENT DOCUMENTS

DE    195 44 022    5/1997
DE    199 08 352    8/2000
(Continued)

OTHER PUBLICATIONS

International Search Report issued by the European Patent Office in International Application PCT/EP2012/001214 on Jun. 21, 2012.

*Primary Examiner* — Calvin Cheung
(74) *Attorney, Agent, or Firm* — Henry M. Feiereisen LLC

(57) ABSTRACT

In a method for monitoring a functionality of a first and a second component of a motor vehicle the requirements for the monitoring are as follows: for a valid monitoring of the first component a predetermined operating condition of the motor vehicle must exist; for a valid monitoring of the second component the first component must be functioning properly. According to the method according to the invention, upon impending travel, taking into account navigation data of a navigation assistance system, it is determined whether the prescribed operating condition is expected to exist.

9 Claims, 2 Drawing Sheets

(56) References Cited

U.S. PATENT DOCUMENTS

| | | | |
|---|---|---|---|
| 6,521,204 B1 * | 2/2003 | Borup et al. | 423/652 |
| 7,761,203 B2 * | 7/2010 | Yamada | 701/33.4 |
| 2008/0302087 A1 | 12/2008 | Genslak et al. | |
| 2010/0030437 A1 * | 2/2010 | Kim et al. | 701/65 |
| 2010/0030447 A1 * | 2/2010 | Smyth et al. | 701/102 |
| 2010/0043404 A1 | 2/2010 | Hebbale et al. | |
| 2011/0066308 A1 * | 3/2011 | Yang et al. | 701/22 |
| 2012/0078509 A1 * | 3/2012 | Choi | 701/423 |
| 2012/0179361 A1 * | 7/2012 | Mineta et al. | 701/410 |

FOREIGN PATENT DOCUMENTS

| | | |
|---|---|---|
| DE | 102007027182 | 12/2008 |
| DE | 102008026859 | 1/2009 |
| DE | 102007052292 | 5/2009 |
| DE | 102008025569 | 12/2009 |
| DE | 102009038110 | 4/2010 |
| EP | 1 734 241 | 12/2006 |
| WO | WO 2004/072460 | 8/2004 |

* cited by examiner

METHOD FOR MONITORING COMPONENTS OF A MOTOR VEHICLE AND MOTOR VEHICLE WITH CORRESPONDING MONITORING DEVICE

CROSS-REFERENCES TO RELATED APPLICATIONS

This application is the U.S. National Stage of International Application No. PCT/EP2012/001214, filed Mar. 20, 2012, which designated the United States and has been published as International Publication No. WO 2012/130403 and which claims the priority of German Patent Application, Serial No. 10 2011 015 396.9, filed Mar. 29, 2011, pursuant to 35 U.S.C. 119(a)-(d).

BACKGROUND OF THE INVENTION

The invention relates to a method for monitoring a functionality of a first and a second component of a motor vehicle. For the monitoring the following relationships exist: for a valid monitoring of the first component a predefined operating condition of the motor vehicle has to be established. For a valid monitoring of the second component the first component has to be functional. The invention also relates to a motor vehicle with a monitoring device for the two components and with a navigation assist device. Components in this context relate in particular to those of emission-lowering devices of the motor vehicle.

In a motor vehicle for example an passenger car it can be provided that the functionality of individual components is regularly monitored by a monitoring device. Thus, an electronic motor control unit of the motor vehicle can be configured to monitor a catalytic converter of the motor vehicle as to whether its oxygen storage capacity is still sufficiently high. For this, a residual oxygen content of an exhaust gas that flows through the catalytic converter can be measured by means of a lambda-probe which is arranged downstream of the catalytic converter. The problem in such a monitoring is that in case of an unrecognized defect of the lambda-probe erroneous measurement values that nevertheless appear plausible, can lead to the fact that a defect of the catalytic converter remains unrecognized by the motor control unit. This can lead to an increased emission of contaminants, which is only recognized when the motor vehicle is examined in a repair shop.

In conjunction with emission-lowering devices of a motor vehicle such as a catalytic converter or an exhaust gas recirculation, the automatic monitoring of the components of these devices by the motor vehicle is mandated by law in some countries. In the European Union such a monitoring device is referred to as European On Board Diagnosis (EOBD). In the US, some states already to date require to equip a motor vehicle with an interface by which a diagnosis device for example in case of a street control can read out actual measuring values of the monitoring device at any time.

SUMMARY OF THE INVENTION

In order to avoid misdiagnosis with regard to a defined component due to a defective measuring probe, a defective valve or another defective part which interacts with the component, measurements regarding a component are in some cases only recognized as a valid when the measuring probe etc. is also monitored and is determined to be functional.

A monitoring of a component however is not always possible. Thus a useful monitoring of the above-mentioned lambda probe requires that the engine of the motor vehicle was operated at least once with a lean fuel mixture ($\lambda>1$) and once with a rich ($\lambda<1$) fuel mixture. Also a component to be monitored often has to have a defined operating temperature before it can be appropriately tested.

A problem can arise in this context when a motor vehicle is regularly only used for drives in which such operating conditions for the monitoring of a first component are only established at the end of the drive. In this case it is not possible to subsequently monitor a second component, whose monitoring requires that the functionality of the first component is verified. Thus, the second component remains unmonitored over longer periods of time.

From DE 10 2000 903-8110 A1 a method for managing an exhaust gas post-processing system in a vehicle with a catalytic converter device is known. According to the method a digital card is monitored through which a predicted operating condition is provided on a driving route. The operation of the catalytic converter device is controlled based on a predicted exhaust gas temperature profile.

Object of the present invention is to enable monitoring of components of a motor vehicle as frequently as possible.

The object is solved by a method for monitoring a functionality of a first and a second component of a motor vehicle, including determining for a forthcoming drive whether a first operating condition of the motor vehicle will be established by taking into account navigation data which provide information regarding a driving course, wherein a valid monitoring of the first component requires that the first operating condition of the motor vehicle is established and a valid monitoring of the second component requires the functionality of the first component, and a motor vehicle including a navigation device constructed for determining driving course data that relate to a drive; and a monitoring device which is configured to check a functionality of a first and a second component of the motor vehicle, wherein the monitoring device is configured to receive the driving course data from the navigation device, to determine in dependence on the driving course data whether a possibility for monitoring the first component during the drive will be established, and to monitor the second component when a possibility of a monitoring the first component is also expected to exist. Advantageous refinements of the invention are set forth in the sub claims.

The method according to the invention serves for monitoring a functionality of a first and of a second component of a motor vehicle. For example the first component can be a lambda probe and the second component can be a catalytic converter.

By means of the method the monitoring is even possible when the following preconditions have to be satisfied in order for drawing meaningful conclusions from the monitoring results regarding the functionality in the first place. For a valid monitoring of the first component (i.e., in the example the monitoring of the lambda probe) a predefined first operating state of the motor vehicle must exist i.e., for example a defined temperature of the measuring probe or a performed defined sequence of injected fuel mixtures. For the second component (in the example this is the catalytic converter) the functionality of the first component (in the example the measuring probe) is a precondition for its valid monitoring.

According to the method according to the invention for a forthcoming drive it is determined by taking navigation data into account whether the first operating state is expected to exist. Navigation data in this context generally relate to such data, which would provide information relating to a route of the drive. These can for example be map data from the navigation device, GPS-information from a GPS receiver, traffic information from an RDS (RDS—Radio Data System) or geographical information regarding a height profile of the route.

The method according to the invention has the advantage that it can be recognized whether during the drive the possibility may arise to monitor the first component. When this is the case a monitoring result regarding the first component does not first have to be awaited during the drive i.e., in the example monitoring result relating to the lambda probe, in order to then monitor the second component. The second component can be immediately monitored at any time when corresponding operating conditions exist. In the method according to the invention the second component is monitored prior to the first component. As a result of the analysis of the navigation data it is known that during the drive it is still possible to validate the accuracy of the monitoring result regarding the second component at a later point by monitoring the first component. Overall, more opportunities can be used during the drive to test the second component.

The monitoring result can in particular be validated in such a manner that the second component is monitored as soon as a predetermined second operating condition of the motor vehicle exists which is a prerequisite for a valid monitoring of the second component, and in that the result of the monitoring is only provided when a result of the monitoring of the first component indicates its functionality.

An advantageous refinement of the method according to the invention results when by taking the navigation data into account it is also determined whether during the drive the second operating condition (which is required for monitoring the second component) will most likely exist. This allows determining the time point for a starting the measuring for monitoring the second component already before hand. The measurement can thus already start before the second operating condition is established. This allows advantageously carrying out comprehensive measurements for the monitoring which for example can include a transition into the second operating condition. This is otherwise only possible by continuously measuring during the entire drive. Of course the same advantage can also be obtained with regard to the first operating condition for determining a corresponding time point.

The method according to the invention can advantageously be used for monitoring components of the motor vehicle in many ways. Thus, one of the components can for example be a lambda-probe, a catalytic converter, a component of a secondary ventilating system, an actuating device or a camshaft, a temperature sensor (particular an exhaust gas temperature sensor), a device for measuring and air mass suctioned in by an engine or a control device.

In a further embodiment of the method according to the invention at least one value, which describes the operating condition of the motor vehicle, is determined by means of a numerical model for an environment through which the driving route leads. With this, the problem can be for example addressed that for a future drive through a city it is not known at which time point a defined traffic light that the route encounters is switched to read. A corresponding model for an urban environment can be used to determine at least a likelihood for a halt of the motor vehicle at a red traffic light. This allows reliably predicting an operating condition of the motor vehicle.

Another advantageous embodiment of the method according to invention provides for determining at least one value, which describes an operating condition of the motor vehicle by means of a numerical model for at least a part of the motor vehicle. Such a model of physical processes in the part of the motor vehicle allows to draw a relatively accurate conclusion regarding a future operating condition of the part of the motor vehicle in dependence on the driving route data.

The implementation of the method according to the invention is enabled by a motor vehicle according to the invention. For this, the latter has a navigation assist device, which enables determining driving routes data relating to the drive. A navigation assist device can for example include a navigation device, a GPS receiver or a radio with RDS receiver. In addition, a monitoring device is provided which is configured to monitor a functionality of a first and a second component of the motor vehicle. The monitoring device can receive the driving route data from the navigation assist device and in dependence on the driving route data determine whether a possibility for monitoring the first component during the drive will exist. The second component is then monitored during the drive in the case that the possibility of monitoring of the first component is established, and the second component is hereby monitored during the drive prior to monitoring the first component.

In the motor vehicle according to the invention, the same advantages result as described in connection with the method according to the invention. The motor vehicle according to the invention can also be further developed in the same manner as described in connection with the method according to the invention.

BRIEF DESCRIPTION OF THE DRAWING

In the following, the invention is described in more detail by way of a preferred exemplary embodiment. It is shown in.

DETAILED DESCRIPTION OF PREFERRED EMBODIMENTS

Figure 1:
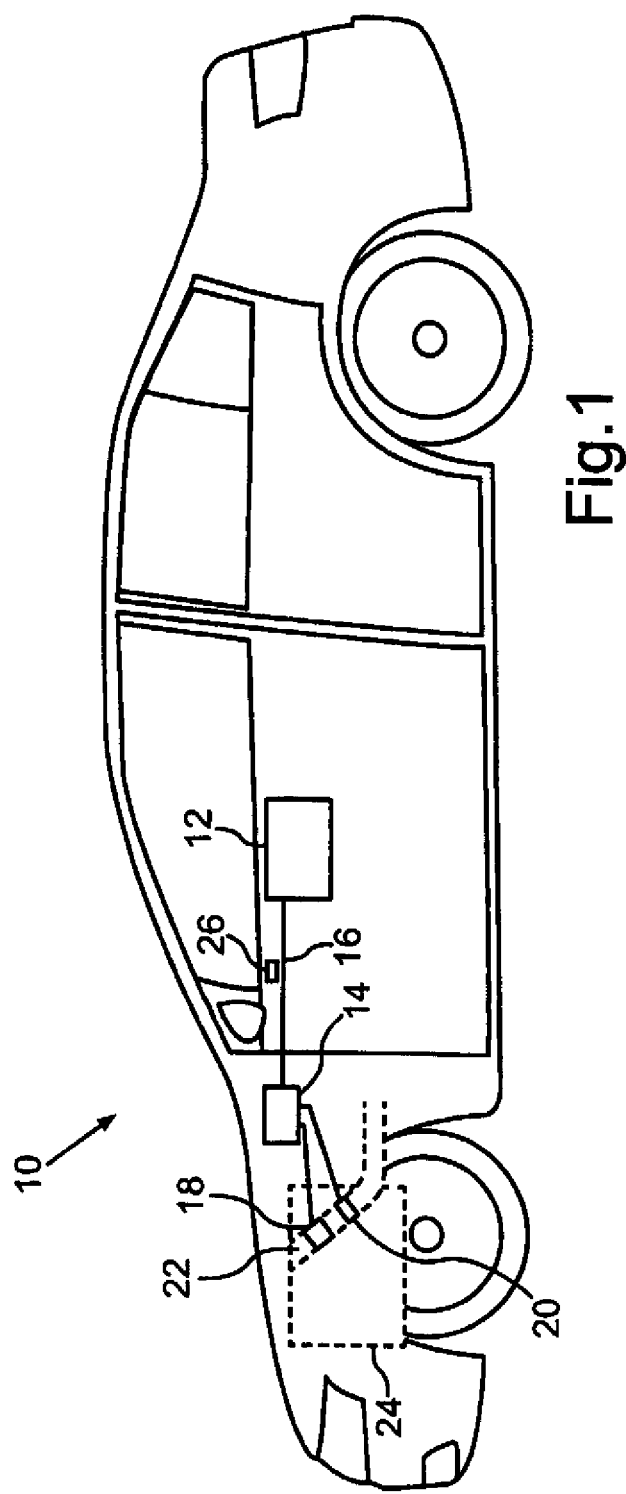
FIG. 1 a motor vehicle according to an embodiment of the motor vehicle according to the invention.

In the example shown in FIG. 1 the motor vehicle 10 with a navigation device 12 and a monitoring device 14 is shown. The navigation device 12 is part of an (not further shown) infotainment system of the motor vehicle 10. The monitoring device 14 is part of an electric motor control device. However, it can for example also be provided by another control device or can be divided into multiple control devices.

The monitoring device 14 is coupled with the navigation device 12 via a communication bus 16 which can for example be a component of a CAN (controller area network) an LIN (local interconnect network) or a FlexRay-fieldbus system.

A catalytic converter 18 and a lambda-probe 20 (in the following refer to as measuring probe 20) are monitored by the monitoring device 14 during a drive of the motor vehicle 10 regarding their functionality. These two components are situated on an exhaust manifold 22 of an internal combustion engine 24 of the motor vehicle 10.

The monitoring device 14 carries out the monitoring during the drive according to a measuring protocol mandated by law. According to this protocol the catalytic converter may be monitored during a drive only when it is determined during the same drive that the measuring probe 20 is functional. In other words the two monitors have to occur within the same driving cycle. A driving cycle is defined as the time between the starting of the internal combustion engine 24 until its turning off.

In unfavorable cases, a monitoring of the catalytic converter is not possible during a defined driving cycle when the motor vehicle 10 does not drive on any section of the driving route with an almost constant speed for a defined minimal period of time and thereby a temperature of the catalytic converter is above a defined minimal value.

In the motor vehicle 10, the ratio of the number of driving cycles in which catalytic converter 18 is monitored to the total number of the driving cycles driven with the motor vehicle 10 is particularly high.

For this, at the beginning of the driving cycle items of information relating to the future drive are transmitted to the monitoring device 14 via the communication bus 16 in the form of digital navigation data 26. The navigation data 26 are always available when the driver of the motor vehicle 10 enters the destination of the drive into the navigation device 12.

Figure 2:
FIG. 2 a diagram showing a predicted temporal profile of a speed of the motor vehicle of FIG. 1 as determined by a monitoring device of the motor vehicle according to an embodiment of the method according to the invention.

Based on the navigation data 26 the monitoring device 14 calculates by means of a numerical model a temporal profile 28, shown in FIG. 2, of the speed v of the motor vehicle, as it is expected to occur according to the model during the drive at respective time points t.

Figure 3:
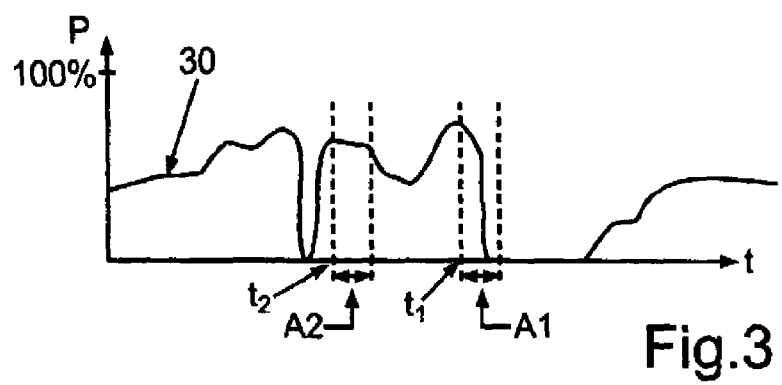
FIG. 3 a diagram showing a temporal profile of a power that has to be outputted by an internal combustion engine of a motor vehicle, predicted by the monitoring device of the motor vehicle of FIG. 1.

In addition, the monitoring device 14 calculates a temporal profile 30 of a power p, which the internal combustion engine is expected to be required to generate at defined time points t. The power p is shown in the diagram of FIG. 3 as percent value of the maximal power, which has to be generated by the internal combustion engine 24.

Based on the two pre-calculated profiles 28 and 30, the monitoring device 14 in the shown example calculates a first section of the driving route in which the motor vehicle 10 is in coasting mode, i.e., the engine does not output any significant power itself but is nevertheless coupled with the drive train, so that its rotational speed is determined by the momentum of the motor vehicle 10.

When the motor vehicle 10 reaches the section A1, the conditions that are required according to the protocol for monitoring the measuring probe 20 are expected to be established. The monitoring device 14 therefore stores a value for the time point $t_1$ at which a measurement for the monitoring of the measuring probe is to begin.

In addition, the monitoring device determines based on the two profiles 28 and 30 a section A2 of the driving route, which is suited for monitoring the catalytic converter 18. In the section A2, the motor vehicle 10 is expected to drive with an approximately constant speed v, wherein the internal combustion engine 24 generates a nearly constant power P. From a (not shown) temporal profile of the temperature of the catalytic converter 18 it can be concluded that the catalytic converter 18 will be hot enough when reaching the section A2 in order to perform a monitor the catalytic converter 18, which monitor is valid according to the protocol. The monitoring device 14 stores therefore also a value for a time point $t_2$ at which the measurement for the monitoring of the catalytic converter 18 is to begin.

During the drive the monitoring device 18 begins the diagnosis of the catalytic converter 18, i.e., it's monitoring at the time point 12. For this, signals of the measuring probe 20 are detected by the monitoring device 14 and stored. After completing the measurement when the motor vehicle 10 thus has left the section A2 of the driving route it is determined by way of the measured data whether the catalytic converter 18 functions in the mandated manner. The result of this analysis is stored and preliminarily marked as invalid so that it cannot be read out from the monitoring device by a (not shown) diagnosis device.

At the later time point $t_1$ the monitoring device 14 starts the monitoring of the measuring probe 20 by detecting and storing further data. After the motor vehicle 10 has left the section A1 of the driving route and the measurement is thus completed, the monitoring devices determines by way of the data gathered in the section A1, whether the measuring probe 20 is defective. The monitoring device 14 also stores this analysis result so that it can be read out by the diagnosis device.

When the measuring probe 20 is functional according to the analysis result, the additional marking, which prevents the reading out of the analysis result, is removed with regard to the catalytic converter. With this, this analysis result is then also available for being read out.

Beside a monitoring of the functionality of the catalytic converter 18 and the measuring probe 20 it can be provided to monitor for example also a catalytic converter heating a sensor for misfires, an exhaust gas recirculation device a secondary vent system a fuel container venting system, electric circuits or a holding device for a tank lid with regard to their functionality with the monitoring device 14 (or further monitoring devices of the motor vehicle 10).

The example shows how the number of the driving cycles can be increased in which a diagnosis of a catalytic converter is carried out.

The invention claimed is:

1. A method for monitoring a functionality of a first and a second component of a motor vehicle, comprising:
    determining with a monitoring device for a forthcoming drive whether a first operating condition of the motor vehicle is expected to be established during the drive by taking into account navigation data which provide information regarding a driving course; and
    monitoring with the monitoring device the functionality of the second component prior to monitoring with the monitoring device the functionality of the first component when the first operating condition of the motor vehicle is expected to be established during the drive, wherein
    a valid monitoring of the first component requires that the first operating condition of the motor vehicle is established and
    a valid monitoring of the second component requires the functionality of the first component.

2. The method of claim 1, further comprising monitoring with the monitoring device the functionality of the second component as soon as a predetermined second operating condition of the motor vehicle which is required for a valid monitoring of the second component is established, wherein a result of monitoring the functionality of the second component is only made available when a result of the monitoring the functionality of the first component shows that the first component is functional.

3. The method of claim 2, further comprising determining with the monitoring device for the forthcoming drive whether the second operating state will be established by taking the navigation data into account.

4. The method of claim 3, wherein the first and second operating condition is a value selected from the group consisting of a speed of the motor vehicle, a power to be generated by the motor of the motor vehicle, a rotational speed of the motor, a selected transmission gear of a transmission of the motor vehicle, a negative pressure in an intake manifold of the motor vehicle, a composition of a fuel-air-mixture and a temperature of a component of the motor vehicle.

5. The method of claim 3, wherein at least one value, which describes the first and second operating state is determined by means of a numerical model for an environment through which the driving course extends.

6. The method of claim 3, wherein at least one value, which describes the first and second operating condition is determined by means of a numerical model for at least a part of the motor vehicle.

7. The method of claim 1, wherein one of the first and second components includes a member selected from the group consisting of a lambda-probe, a catalytic converter, a component of a secondary ventilation system, an actuating device for a camshaft, a temperature sensor, a device for measuring an air mass suctioned in by the motor and a control device.

8. The method of claim 7, wherein the temperature sensor is constructed as an exhaust gas temperature sensor.

9. A motor vehicle comprising:
- a navigation device constructed for determining driving course data that relate to a drive; and
- a monitoring device which is configured to monitor a functionality of a first and a second component of the motor vehicle, said monitoring device being configured
- to receive the driving course data from the navigation device,
- to determine in dependence on the driving course data whether a possibility for monitoring the first component during the drive is expected to be established, and
- to monitor the second component during the drive prior to monitoring the first component when the possibility of monitoring the first component is expected to be established during the drive.

* * * * *